United States Patent [19]
Cretti

[11] Patent Number: 5,792,481
[45] Date of Patent: Aug. 11, 1998

[54] APPARATUS FOR MOLDING A CONTINUOUS FOAMED PLASTIC ELEMENT

[75] Inventor: Piero Cretti, Ticino, Switzerland

[73] Assignee: Plastedil S.A., Chiasso, Switzerland

[21] Appl. No.: 652,939

[22] Filed: May 24, 1996

[51] Int. Cl.⁶ .................................................. B29C 44/20
[52] U.S. Cl. .................. 425/4 C; 264/45.8; 264/167; 264/212; 425/224; 425/447; 425/817 C
[58] Field of Search ............................ 425/46, 381, 465, 425/466, 467, 224, 817 C, 447; 264/41, 45.9, 46.1, 167, 177.16, 45.8, 212, 177.1, 177.12, 177.14

[56] References Cited

U.S. PATENT DOCUMENTS

| | | | |
|---|---|---|---|
| 3,639,550 | 2/1972 | Darmochwal | 425/4 C |
| 3,702,747 | 11/1972 | Porter et al. | 425/4 C |
| 4,456,443 | 6/1984 | Rabotski | 425/4 R |
| 4,505,662 | 3/1985 | Hay, II | 425/817 C |
| 4,588,541 | 5/1986 | Fowler | 425/817 C |
| 4,756,859 | 7/1988 | Cretti | 425/4 C |
| 5,340,300 | 8/1994 | Saeki et al. | 425/817 C |

FOREIGN PATENT DOCUMENTS

| | | |
|---|---|---|
| 85 21 706.9 | 5/1986 | Germany. |
| 1051111 | 4/1981 | Italy. |
| 57-113 038 | 7/1982 | Japan. |
| 1 546 153 | 5/1979 | United Kingdom. |
| 2 098 124 | 11/1982 | United Kingdom. |

*Primary Examiner*—Jay H. Woo
*Assistant Examiner*—Joseph Leyson
*Attorney, Agent, or Firm*—Whitham, Curtis & Whitham

[57] ABSTRACT

An apparatus for molding a continuous foamed plastic element, such as a floor element having a substantially parallelepipedic central body and at least one side lug, includes a mold in which respective molding cavities of the central body and of the side lug are defined between a bottom wall, a pair of opposite side walls and a cover. A mechanism adjustably positions at least one of the cover and one or both of the side walls of the mold, away from and towards the bottom wall, to regulate, in an adjustable and substantially continuous manner, the height of the molding cavities for at least one of the central body and the at least one side lug of the continuous element.

23 Claims, 6 Drawing Sheets

APPARATUS FOR MOLDING A CONTINUOUS FOAMED PLASTIC ELEMENT

BACKGROUND OF THE INVENTION

1. Field of the Invention

In a general aspect, the present invention relates to an apparatus for molding a continuous foamed plastic element.

More specifically, the present invention relates to an apparatus for molding a continuous foamed plastic element comprising a substantially parallelepipedic central body and, optionally, at least one lug laterally and longitudinally extending from said body, which finds a preferred but not mandatory use as a building construction component.

In the following description and the subsequent claims, the term: "continuous foamed plastic element" means a foamed plastic section bar, e.g. made of foamed polystyrene, which leaves the molding apparatus as a single piece substantially free from joints or breaks and having indefinite length.

2. Description of the Related Art

As is known, in the field of building construction in general, the use has long enjoyed success of foamed plastic construction elements, preferably made of foamed polystyrene, in the form of sheets or section bars of appropriate shape and size, having the function of thermal and acoustic insulating material.

According to the most widespread known technique, such as for example that described in Italian patent n. 1,051,111 filed by the same Applicant, the construction elements of the type considered are obtained by cutting in pieces of predetermined length a continuous element produced by means of molding apparatuses comprising a mold in which a molding seat is defined having a shape mating that of the continuous element to be produced.

In each molding cycle, a metered quantity of expandable plastic material in granules is fed into the above mentioned seat and subjected to expansion with a mutual welding of the granules through the action of heat, so as to form a new portion of the continuous element and obtain its simultaneous welding with an adjacent portion formed in a preceding molding cycle.

At the end of the molding and subsequent stabilization operations, the mold is opened and the continuous element incorporating the new portion is made to advance by a distance corresponding to the length of the molding seat, so as to arrange the latter for receiving other granules and initiating a new production cycle.

In this manner, a continuous foamed plastic element of indefinite length is obtained by means of successive molding operations, which element may be subsequently cut in portions of definite length that may be chosen at will.

Although substantially meeting the purpose, the molding apparatus of the prior art displays poor operating flexibility and, more specifically, does not allow an easy control of the shape, and in particular of the height, of the continuous foamed plastic element where required.

Thus, for example, each time it is desired to change the height of the element to confer improved mechanical strength thereto, the prior art proposes to change the height of the molding seat defined in the mold, by inserting spacers of adequate thickness into the cover each time as needed.

Consequently, there is not only the need to stop the molding operations for adapting the mold, but also the need to keep in storage a set of spacers of different lengths to perform the desired adjustment as required.

It goes without saying that in addition to an undesired capital locking-up, such an 'adjustment' may not in fact allow the production of elements having heights different from that predefined by the thickness of the available spacers.

This technique, furthermore, is very difficult if not impossible to apply each time it is desired to adjust the height of any lateral lugs present in the continuous element, such as for example in the case of the so-called floor elements, when it is desired to impart to these elements improved thermal and acoustic insulation characteristics.

The technical problem underlying the present invention is therefore that of providing an apparatus for molding a continuous foamed plastic element capable of overcoming the above-mentioned shortcomings of the prior art.

SUMMARY OF THE INVENTION

According to a first aspect of the present invention, this problem is solved by an apparatus for molding a continuous foamed plastic element comprising:

a) a mold including:

i) a bottom wall, a pair of opposite side walls and a cover, ii) a molding seat, having a shape mating that of said element, defined in said mold between said side walls, said bottom wall and said cover;

b) means for displacing said cover and said side walls of the mold towards and away from said bottom wall to longitudinally close and respectively open said mold;

c) first means for positioning in an adjustable manner said cover away from and towards said bottom wall of the mold to control in an adjustable and substantially continuous manner the height of the molding seat.

According to a preferred embodiment of the present invention, the height of the molding seat for the foamed plastic element may be advantageously controlled in a substantially continuous manner between a minimum and a maximum predetermined design value by at least one powered mechanical jack.

Preferably, furthermore, the above mentioned means designed to control the displacement of the mold cover 10 comprises a pair of mechanical jacks kinematically connected together by a shaft rotated by the above mentioned powered means.

In this case, in fact, an adequate parallelism may be provided to the raising/descending movement of the cover away from and towards the bottom wall of the mold.

According to a second aspect of the present invention, the aforementioned problem is solved by an apparatus for molding a continuous foamed plastic element of the type comprising a substantially parallelepipedic central body and at least one lateral lug laterally and longitudinally extending from said central body, said apparatus including:

a) a mold, wherein a molding seat having a shape mating that of said element is defined, comprising:

i) a bottom wall, a pair of opposed side walls and a cover;

ii) a first molding cavity for the central body of said element, defined in said seat between said side walls, said bottom wall and said cover;

iii) a second molding cavity for said at least one lug of said element, defined in said seat between a groove formed in at least one of said side walls and said bottom wall;

b) means for displacing said cover and said side walls of the mold towards and away from said bottom wall to longitudinally close and respectively open said mold;

c) means for positioning in an adjustable manner said at least one side wall away from and towards said bottom wall of the mold to control in an adjustable and substantially continuous manner the height of said second molding cavity.

Similarly to what is set forth above with reference to the previous embodiment of the invention, the height of the second molding cavity, in which the side lug of the foamed plastic element is molded, may be advantageously controlled in a substantially continuous manner between predetermined design minimum and maximum values by at least one mechanical jack equipped with respective power means.

Preferably, the grooved side wall defining—together with the bottom wall of the mold—the second molding cavity for the side lug, is equipped with a pair of mechanical jacks kinematically connected together by a shaft rotated by the above mentioned power means.

In this case, in fact, an adequate parallelism may be provided to the raising/descending movement of the cover away from and towards the bottom wall of the mold.

According to a third aspect of the present invention, the aforementioned problem is solved by an apparatus for molding a continuous foamed plastic element of the above mentioned type , comprising first and second means for independently and adjustably positioning said cover and said at least one side wall away from and towards said bottom wall of the mold to control in an adjustable and substantially continuous manner the height of said first and, respectively, said second molding cavities.

Advantageously, the height of the first molding cavity of the foamed plastic element—or at least its overall height—may be in this case controlled simultaneously and independently of that of the molding cavity defining its side lugs.

BRIEF DESCRIPTION OF THE DRAWINGS

Further characteristics and advantages of the present invention will be more clearly apparent from the description of a preferred embodiment of an apparatus for molding a continuous foamed plastic element according to the present invention given below by way of non-limiting illustration with reference to the annexed drawings.

In the drawings.

DETAILED DESCRIPTION OF THE PREFERRED EMBODIMENT

With reference to the above mentioned figures, reference number 1 indicates as a whole an apparatus according to the present invention for molding a continuous foamed plastic element, such as for example a continuous element 15 designed for the construction of floors.

Figure 4:
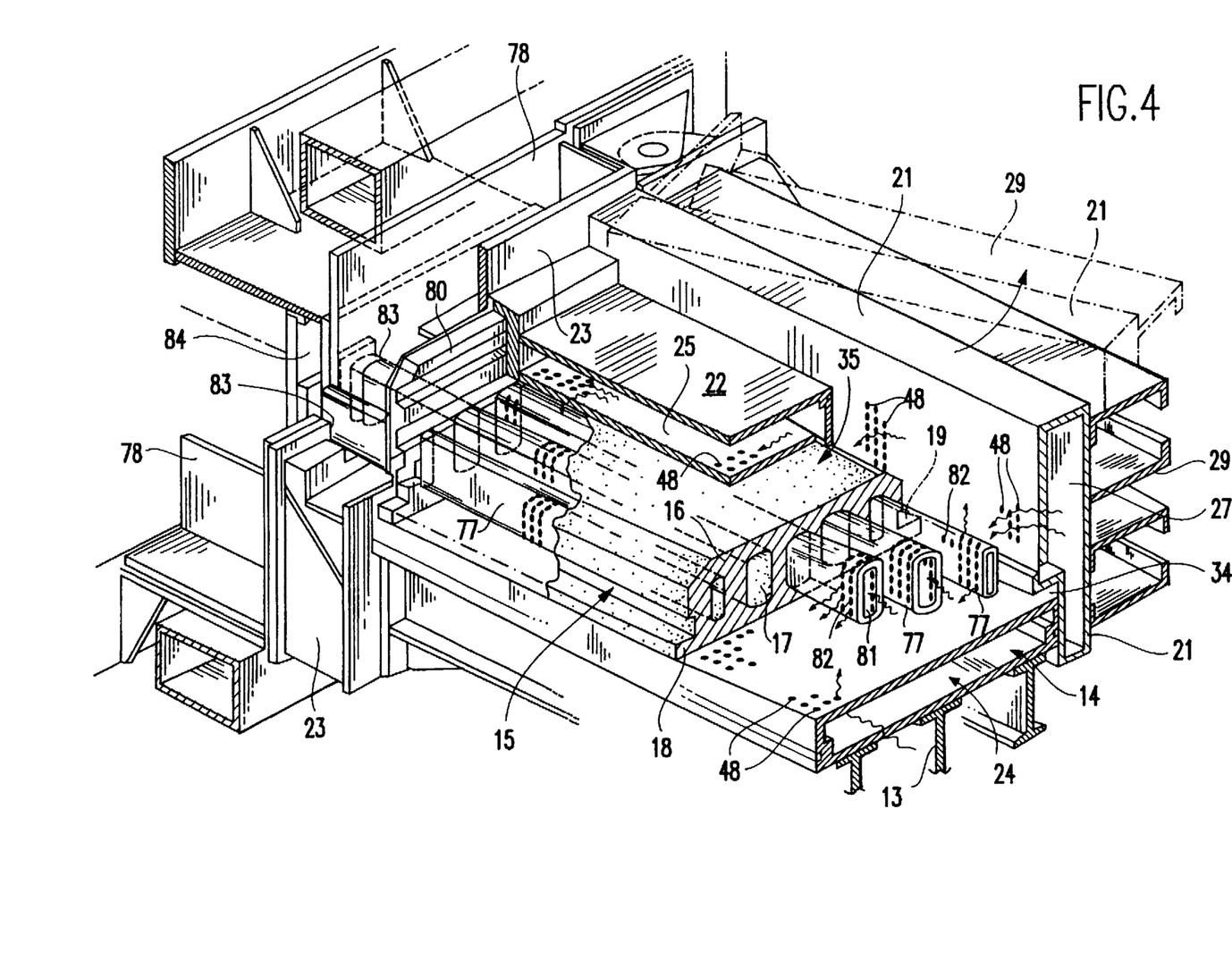
FIG. 4 shows a perspective view, in partial cross-section and enlarged scale, of some particulars of the apparatus of FIG. 1.

In the illustrated example, the element 15 comprises a body 16, in which are longitudinally defined a plurality of parallel cavities 17, as well as a pair of lugs 18, 19 extending laterally and longitudinally from opposite parts of the body 16 (FIG. 4).

The apparatus 1 comprises a mold 2 mounted on a supporting structure including a side panel 4, substantially rectangular in shape, as well as a substantially cage-like structure, globally indicated by 10, which are fixed in a known manner to a pair of parallel beams 3a, 3b.

The cage-like structure 10 comprises, more specifically, two pairs of posts 5a–5b and 5c–5d parallel with one another and symmetrically arranged on opposite sides of apparatus 1.

The posts of each of the above mentioned pairs 5a–5b and 5c–5d are mutually spaced and reciprocally stiffened by respective cross-pieces 6, 7 extending parallel to the mold 2.

The posts 5a–5c and 5b–5d are in turn mutually spaced and stiffened by a second pair of cross-pieces 8, 9 extending perpendicularly to the mold 2.

The mold 2 of molding apparatus 1 essentially comprises a bottom wall 14, a pair of opposite and parallel side walls 20, 21 and a cover 22 defining—in cooperation with a vertical head 23—a substantially tunnel-shaped molding seat, having a shape mating that of element 15.

The bottom wall 14 of the mold 2 is supported by a horizontal supporting frame 13 while the side walls 20, 21 and the cover 22 of the mold 2 are fixed to respective supporting and stiffening beams indicated by 28, 29 and 30.

According to a preferred embodiment of the present invention, the bottom wall 14, side walls 20, 21 and cover 22 of the mold are fixed to the supporting frame 13 and to the supporting beams 28–30 in a removable manner by known fastening means such as e.g. bolts or lever clamping means.

The mold 2 also comprises, as better explained below, a first zone 2a for expanding the plastic material in granules and for actually molding a portion of predetermined length of the element 15 and a second zone 2b, adjacent to the former, designed to allow a shape stabilization of the portion molded in a previous operating cycle.

The vertical head 23 is essentially made up of a hollow body fixed in a known manner (not shown) to the horizontal supporting frame 13 on which the bottom wall 14 of the mold 2 is mounted in a removable manner.

The horizontal supporting frame 13 is in turn supported by beams 3a, 3b of apparatus 1 through a pair of substantially bridge-like supporting elements 11, 12.

Onto the vertical head 23 is fixed a grooved plate 80, preferably lined with a low-friction material, such as for example polytetrafluorethylene, designed to form at one end of the element 15 a corresponding grooved surface having a mating form.

This grooved surface allows to obtain, as clarified below, an optimal mutual welding between adjacent portions of element 15 molded by the apparatus 1 during sequential molding cycles.

In the apparatus 1 the aforementioned vertical head 23 closes at one end the molding seat defined in the mold 2 whose opposite end is closed in a removable manner by a sidewall 56 supported in a rotating manner by the horizontal supporting frame 13 by a hinge 57.

Thanks to the above mentioned hinge 57, the sidewall 56 is angularly movable between a first position wherein it opens zone 2b of the mold 2 and a second position, wherein it closes said zone, in which is retained in a removable manner by appropriate clasping means fixed to the beam 30 supporting the cover 22.

Preferably, the clasping means of the sidewall 56 comprises a groove 68, transversely formed in the beam 30 at the free end of the cover 22 of the mold 2, in which the free end of the sidewall 56 is received in a removable manner with a mating fit.

The above mentioned bottom wall 14, side walls 20, 21 and cover 22 of the mold 2 are essentially constituted by hollow boxed bodies in which adjacent chambers, structurally independent from one another are defined, having a length substantially equal to the length of zones 2a and, respectively, 2b of the mold.

Figure 2:
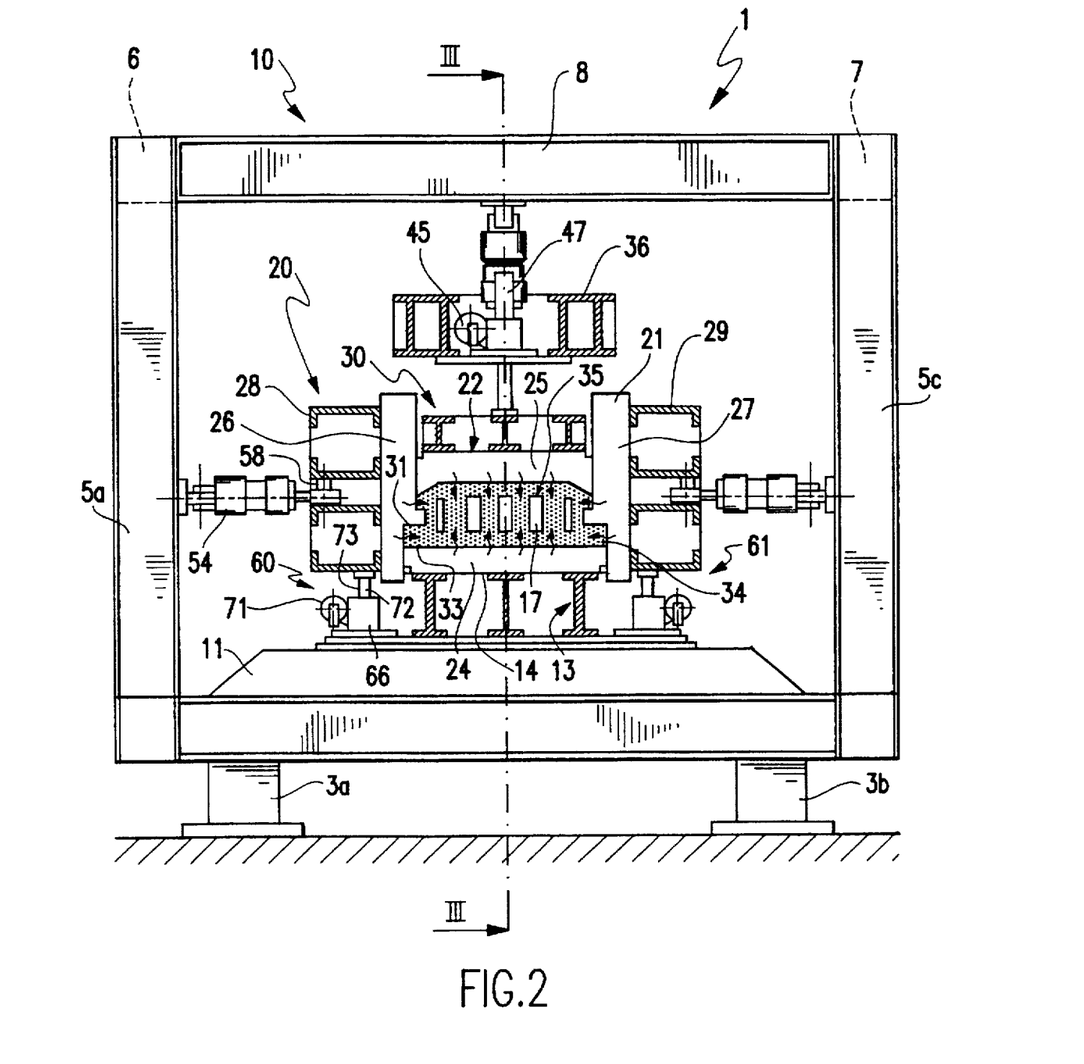
FIG. 2 shows a transversal cross-section view, taken along line II—II of FIG. 1, of the apparatus of that figure.

The chambers defined in the bottom wall 14, side walls 20, 21 and cover 22 and extending along the first expanding and molding zone 2a of the mold 2 will be indicated hereinbelow by references 24-27 (FIG. 2).

In each of the chambers 24, 25, 26, 27 are fed in appropriate sequence appropriate fluids for heating and cooling the portion of element 15 being molded.

In order to feed the above mentioned fluids into the zone 2a of the mold 2, each of the above mentioned chambers is also equipped with a plurality of slots or holes all indicated by 48.

The side walls 20 and 21 of the mold 2 comprise, in the embodiment illustrated, respective grooves 31, 32 substantially L-shaped, longitudinally extending for the entire length of side walls 20 and 21.

These grooves possess a predetermined height and depth defined during design as a function of the particular shape it is desired to impart to lugs 18, 19 of the element 15.

Thanks to the particular shape of the side walls 20, 21 of the mold 2, a first molding cavity 35 for the central body 16, as well as opposite second molding cavities 33, 34 for the side lugs 18 and 19 of the element 15 are defined within the mold 2 and in the above mentioned molding seat.

The second molding cavities 33, 34 are in particular defined between the above mentioned L-shaped grooves 31 and 32 and the bottom wall 14 of the mold 2.

According to a preferred feature of the present invention, the beam 30 supporting the cover 22 of the mold 2 is connected to a supporting frame 36, horizontally extending above the mold 2, by an adjustment device 37 which is described in detail hereinbelow.

Advantageously, the cover 22 may be moved in an adjustable manner by the device 37 away from and towards the bottom wall 14 to adjust in a substantially continuous manner the height of the molding cavity 35 of the central body 16 of the element 15.

According to a preferred embodiment of the present invention, the height of the central body 16 of the continuous element 15 may be freely varied between 180 and 320 mm to provide a range of adjustment equal to approximately 140 mm.

Figure 3:
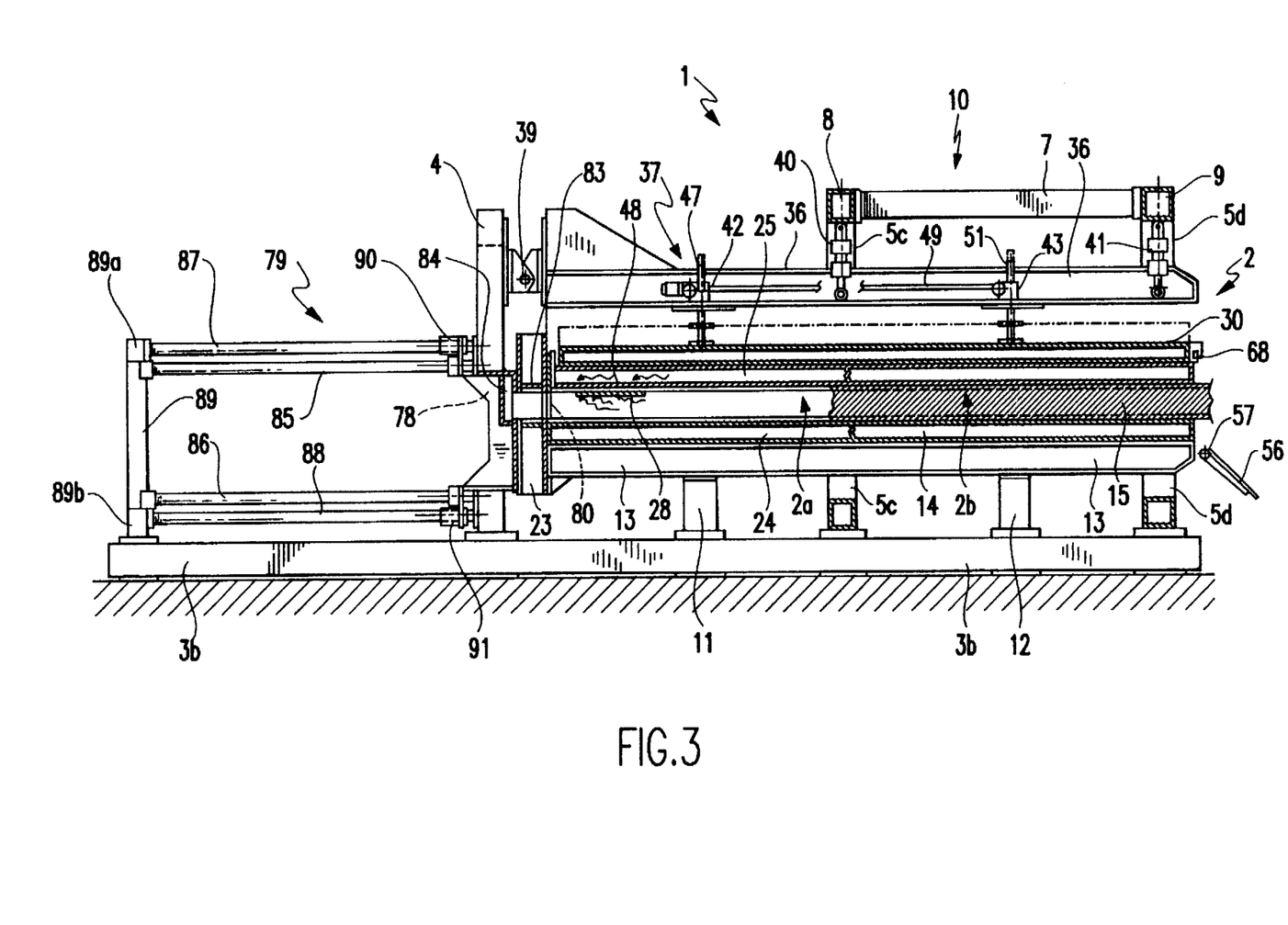
FIG. 3 shows a longitudinal cross-section view of the apparatus of FIG. 1, taken along line III—III of FIG. 2.

The supporting frame 36 is in turn hinged to the side panel 4 through a pair of parallel hinges 38, 39 having horizontal axes and is supported by the cross-pieces 8 and 9 of the substantially cage-like structure 10, to which the supporting frame 36 is associated, by a pair of double-action oil-pressure cylinders 40, 41 (FIG. 3).

According to the present invention, the hinges 38, 39 and the oil-pressure cylinders 40 make up all together an opening device for the cover 22 by which the cover may be displaced angularly away from and towards the bottom wall 14 to close and, respectively, open the mold 2.

The adjusting device 37 of the cover 22 comprises a pair of mechanical jacks 42, 43 supported at a predetermined distance along the supporting frame 36 so as to allow an adequate parallelism of the raising/descending movement of the cover 22.

The jack 42, which is operated by an electric motor 45 with an interposed gear motor, comprises a gear wheel (not shown) engaged with a rack 46 formed on a rod 47 vertically extending from the beam 30.

According to a preferred feature of the present invention, the jack 43 comprises in turn a gear wheel (also not shown) kinematically connected with the gear wheel of the jack 42 through a shaft 49 rotated by the electric motor 45.

Again in this case, the gear wheel of the jack 43 engages a rack 50 formed on a rod 51, coplanar and parallel to the above mentioned rod 47, vertically extending from the beam 30.

Figure 1:
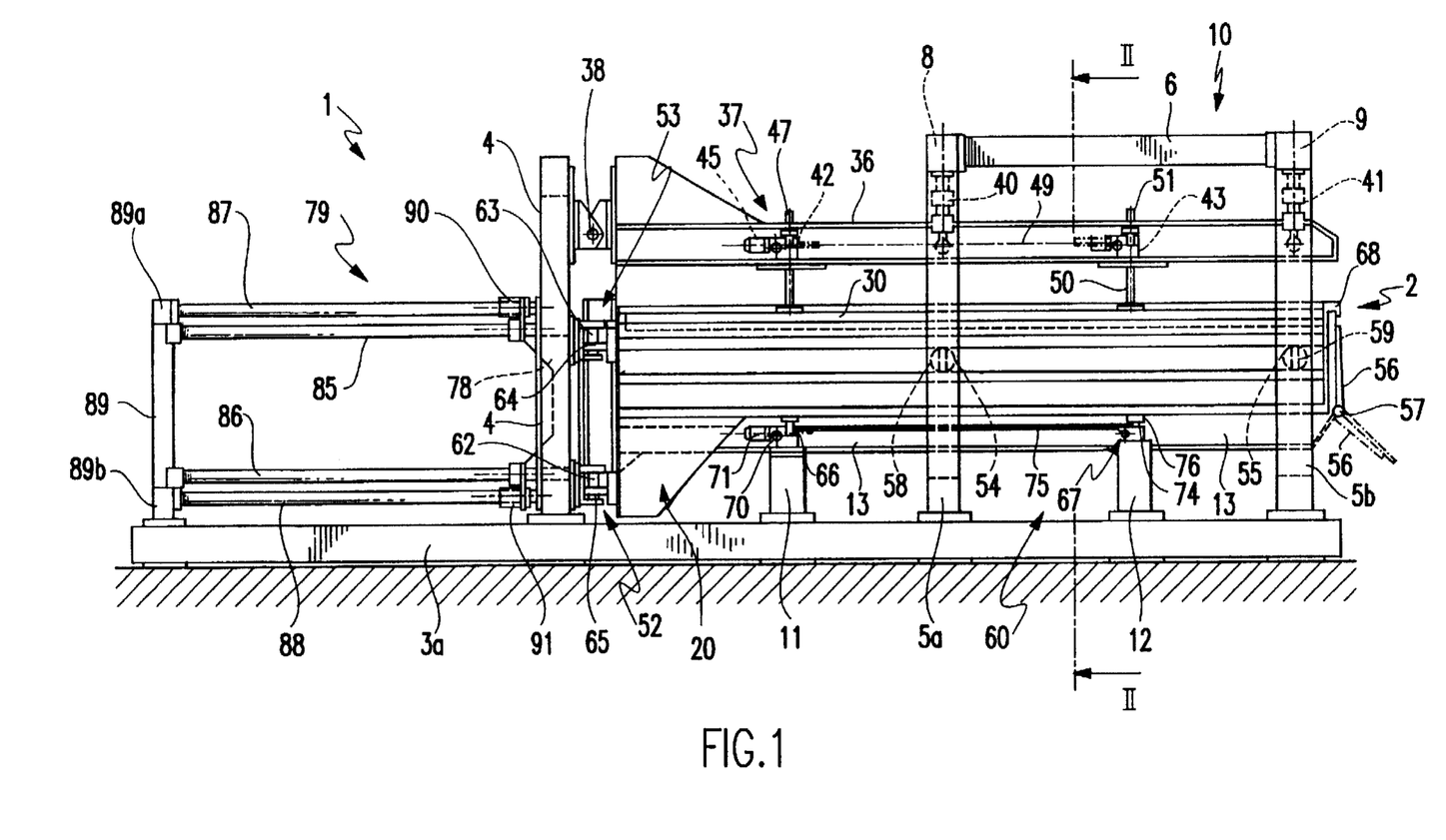
FIG. 1 shows a side view of an apparatus for molding a continuous foamed plastic element according to the present invention.

The beams 28 and 29 supporting and stiffening the side walls 20, 21 of the mold 2 are hinged on opposite sides of the side panel 4 by respective pairs of hinges with vertical axes. In FIG. 1 only those hinges indicated by 52 and 53 of the side wall 20 are visible.

The above mentioned hinges 52, 53 comprise pins 62, 63 of predetermined length coaxially extending in a vertical direction and in which are slidably engaged respective eyelets, 64, 65 extending in mutually spaced relationship from one end of the beam 28.

The pins 62, 63 of the hinges 52, 53 accordingly define a rotation axis around which is mounted in a rotating manner the side wall 20 operated by an opening device which will be described hereinbelow.

Since the side wall 21 of the mold 2 is equipped with an identical opening device, in order to simplify the present description this device will not be described in detail.

This opening device comprises, in addition to the above mentioned pair of hinges 52, 53, a pair of coplanar and parallel double-acting oil-pressure cylinders indicated respectively by 54 and 55, supported in a projecting manner by the posts 5a and 5b of the cage-like structure 10.

Each of the cylinders 54, 55 is equipped with a stem having an eye-shaped free end, engaged in a respective pin 58, 59 of predetermined length and mounted in a known manner onto the beam 28.

According to a feature of the present invention, each of the side walls 20, 21 of the mold 2 may be displaced in an adjustable manner away from and towards the bottom wall 14 to adjust the height of the molding cavities 33, 34 of the side lugs 18, 19 of the element 15 by respective identical operating and adjusting devices 60, 61 arranged on opposite sides of the mold 2.

According to a preferred embodiment of the present invention, the height of the side lugs 18, 19 of the element 15 may be freely changed between 20 and 80 mm providing a range of adjustment equal to approximately 60 mm.

In order to simplify the present description, only the device 60 for operating and adjusting the side wall 20 will be described hereinbelow.

The device 60 (FIG. 1) essentially comprises a pair of mechanical jacks 66, 67 supported at a predetermined distance by the substantially bridge-like elements 11, 12 supported by the beams 3a, 3b, so as to allow an adequate parallelism of the raising/descending movement of the side wall 20.

The jack 66 is operated by an electric motor 71 with an interposed gear motor and comprises a gear wheel (not shown) engaged with a rack 72 formed on a rod 73 associated to the beam 28 supporting the side wall 20.

The jack 67, which is entirely analogous to the previous one, comprises in turn a gear wheel (also not shown) kinematically connected to the wheel of the jack 66 through a shaft 75 rotated by the electric motor 71.

The gear wheel of the jack 67 engages a corresponding rack 74 formed on a rod 76, coplanar and parallel to the above mentioned rod 73, associated to the beam 28 supporting the side wall 20.

According to another preferred feature of the present invention, each vertical displacement of the side wall 20 is advantageously guided both by the pins 62, 63 of hinges 52, 53 and by the pins 58, 59 mounted on the beam 28 and forming part of the opening device of the side wall 20.

According to a preferred embodiment of the present invention, a plurality of substantially tubular plungers 77, having coplanar and parallel axes, is supported in the mold 2 to define the cavities 17 provided in the body 16 to lighten the element 15 to be produced.

The plungers 77, having a length substantially equal to that of the mold 2, are mounted in a projecting manner on a moving head 78 and may be withdrawn from or inserted into the internal space of the mold 2 by an extraction device 79 which is described in detail below.

The plungers 77 are slidably mounted in a corresponding plurality of parallel openings 83 formed both in the vertical head 23 of the mold 2 and in the plate 80 integral therewith.

In an initial section of each plunger 77, having a length equal to that of the zone 2a of the mold, there is also defined—in a manner fully analogous to that of side walls 20, 21, cover 22 and bottom wall 14 of the mold 2—a chamber 81 designed to distribute in an appropriate sequence appropriate heating and cooling fluids in the zone 2a of the mold.

The fluids are in particular fed into each chamber 81 through appropriate ducts—not shown—which are in fluid communication with a cavity 84 defined in the moving head 78 at a first end of the plungers 77.

In correspondence with chambers 81, the plungers 77 are also equipped in an initial portion with a plurality of holes or, alternatively, of slots all indicated by 82.

The extraction device 79 of the plungers 77 essentially comprises the moving head 78 and a pair of oil-pressure cylinders, respectively upper 85 and lower 86, horizontally extending from the moving head 78 to which they are symmetrically fixed in a known manner at opposite side corners with respect to a longitudinal plane of the apparatus 1.

The unit comprising the plungers 77, the moving head 78 and the oil-pressure cylinders 85, 86 is slidably mounted on a pair of upper and, respectively lower, supporting rods 87, 88.

These rods 87, 88 are horizontally extending parallel to the oil-pressure cylinders 85 and, respectively, 86 between the side panel 4 and a respective substantially L-shaped supporting element 89, to which they are fixed in a known manner at the free ends of the L-shaped element 89 indicated by references 89a and 89b.

To this end, each of the oil-pressure cylinders 85, 86 is supported by the corresponding rod 87, 88 to which it is engaged by a respective tubular sliding blocks 90, 91.

Advantageously, the rods 87 and 88 simultaneously fulfill both a supporting function and a guide function for the extraction device 79 of the plungers 77, to ensure a strictly horizontal displacement therof away from and towards the mold 2.

The operation of the apparatus 1 according to the invention described hereinabove is as follows.

Figure 8:
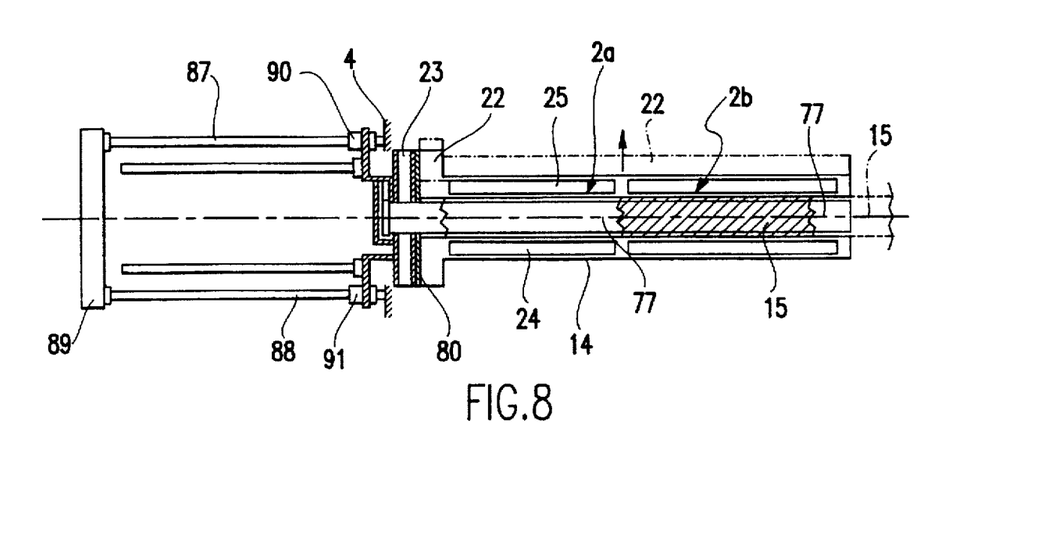

In an initial operating condition, illustrated in FIGS. 3 and 8, the side walls 20, 21 and the cover 22 of the mold 2 are in a closed position towards the bottom wall 14, the sidewall 56 is overturned downward in the open position and a length of the continuous element 15 formed in a previous molding cycle closes the free end of the mold 2 opposite to the vertical head 23.

The moving head 78 is positioned against the fixed vertical head 23 and the molding plungers 77 extend into the mold 2 for the entire length of the latter.

In this operating condition, in the substantially tunnel-shaped molding seat defined in the mold 2 are defined the cavity 35 for molding the central body 16 and the cavities 33, 34 for molding the lugs 18 and 19 of a new portion of the continuous element 15 of indefinite length which it is intended to produce.

The length of the molding cavities 33, 34 is in this condition substantially equal or a little less than that of chambers 24-27 defined within the walls 14, 20, 21 and the cover 22 of the mold 2.

When the apparatus 1 is in this operating condition, a predetermined quantity of expandable plastic material in granules, e.g. pre-expanded polystyrene, is fed into the molding seat of the new portion by a plurality of injection ducts and devices known per se, and therefore not shown.

Once the cavities 33, 34 and 35 of the molding seat have been entirely filled, the usual operations of expansion and mutual welding of the plastic granules, as well as stabilization of portion of the element 15 thus molded, are carried out by feeding in sequence into the the mold and into the above mentioned molding cavities steam and cooling water first, creating an appropriate degree of vacuum and feeding compressed air afterwards.

The above mentioned fluids are in particular fed into (or sucked from) the chambers 22-27 of the walls 14, 20, 21 and 22 of the mold 2, as well as into the chambers 81 defined within the plungers 77, before passing into the molding cavities through the holes 48 and 82.

During the molding operations of the new portion of continuous element 15, it takes place the contextual welding thereof to the adjacent portion molded in the previous operating cycles of the apparatus 1 and housed in the stabilization zone 2b of the mold 2.

Figure 6:
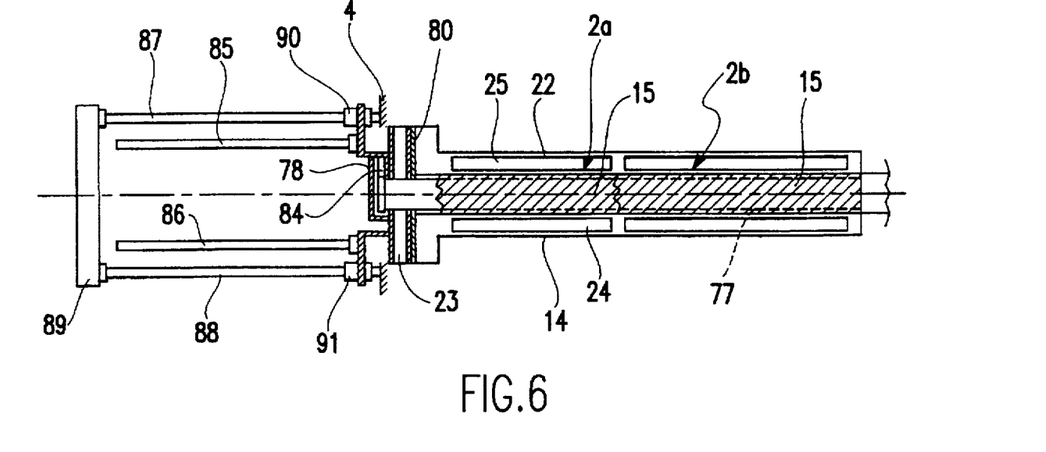
FIGS. 6 to 8 show respective schematic side views of some particulars of the apparatus of FIG. 1 during sequential operating steps thereof.

At the end of the molding operations, a substantially continuous element 15, extending without discontinuities for the entire length of the mold 2 (FIG. 6), is obtained.

When the element 15 has been stabilized, the mold 2 is opened by displacing the side walls 20, 21 and the cover 22 away from the bottom wall 14.

This opening is in particular performed by the oil-pressure cylinders 40, 41 in the case of the cover 22 and 54, 55 in the case of the side wall 20, as well as those acting on the opposite side wall 21.

Thanks to the presence of hinges 38–39 and 52–53 the opening of the cover 22 and of the side walls 20, 21 takes place substantially as that of a book, with disengagement of the cover 22 and of the side walls 20, 21 from the element 15.

Once the mold 2 is open, the extraction device 79 proceeds to partially extract the plungers 77 from the cavities 17 formed in the element 15.

This partial extraction is in particular performed by imparting a backward movement to the moving head 78 by the oil-pressure cylinders 85, 86 whose stroke is guided by rods 87, 88.

Figure 7:
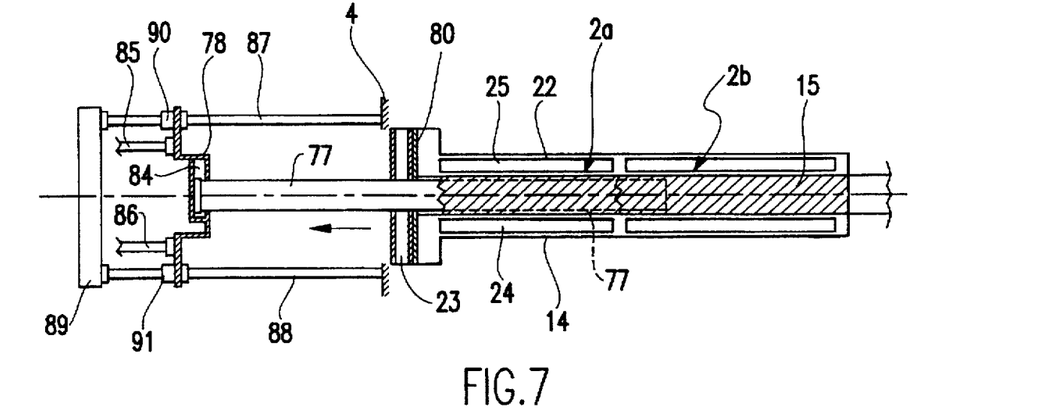

It is to be noted that when the moving head 78 is in its position farthest away from the fixed vertical head 23, the plungers 77 are extracted out of the element 15 by a length substantially corresponding to the length of the molding zone 2a of the mold 2 (FIG. 7).

At the end of this partial extraction step of the plungers 77, the oil-pressure cylinders 85, 86 are again activated to bring back the plungers 77 to the original position together with the moving head 78.

According to an advantageous preferred feature of the present invention, when the total surface area of the plungers 77 is equal to or preferably greater than the surface area of contact between the element 15 and the bottom wall 14 of the mold 2, the plungers 77 exert during their return travel towards the mold 2 a pulling action on the element 15 which enables to displace the element 15 out of the molding zone 2a of the mold 2.

In this case, in fact, the friction developed between the outer surface of the plungers and the inner walls of the cavities 17 formed within the element 15 turns out to be sufficient to overcome the friction developed during sliding between the element 15 and the bottom wall 14 of the mold.

As a consequence, therefore, the plungers 77 may advantageously constitute respective means for displacing and extracting the continuous element 15, thus obviating the use of special extraction devices provided on the molding apparatus of the prior art.

Once the plungers 77 have returned to their position, the cover 22 and the side walls 20, 21 are again closed towards the bottom wall 14 of the mold 2 as illustrated in FIG. 8.

In this configuration, the apparatus 1 is ready to perform a new molding cycle of another portion of the continuous element 15.

According to the present invention, the height of the central body 16 and/or of one or both of the lugs 18, 19 of the element 15, may be easily adjusted by activating the positioning and adjustment device 37 and/or the devices 60 or 61.

Advantageously, when it is desired to adjust the height of the central body 16 and/or of one or both the side lugs 18, 19 within a range of from 1 mm to 5 mm, the above mentioned adjustments may be performed in cycle time, i.e. without removing the element 15 previously molded and without interrupting the operation of the apparatus 1.

In this case, the sidewall 56 is overturned downward in the opening position, so as to allow the extraction of the continuous element 15 from the zone 2b of the mold 2 without interruptions.

On the contrary, when it is desired to change the height of the central body 16 and/or of one of the side lugs 18, 19 within a range of values greater than 5 mm, the continuous element 15 is cut at the free end of the mold and the sidewall 56 is rotated into the closing position of the mold 2 wherein it is permanently held by clasping means 68.

In this case, the sidewall 56 performs the dual function of hermetically closing the mold and acting as an abutting means capable of holding in position the portion of the previous element 15 located in zone 2b during the molding operations of the first length of the new element having a different height of the central body 16 and/or a different height of one or both of the side lugs 18, 19.

Advantageously, the above mentioned adjustment may be performed in a substantially continuous manner between minimum and maximum values, determined during design, thanks to the mechanical jacks 42, 43 in the case of the cover 22 and of the mechanical jacks 66, 67 in the case of the side wall 20.

Thanks to the presence of pairs of mechanical jacks kinematically connected together, every displacement in the vertical direction whether of the cover 22 or of one or both of the side walls 20, 21 takes place assuring a constant parallelism with respect to the bottom wall 14 of the mold 2.

Figure 5:
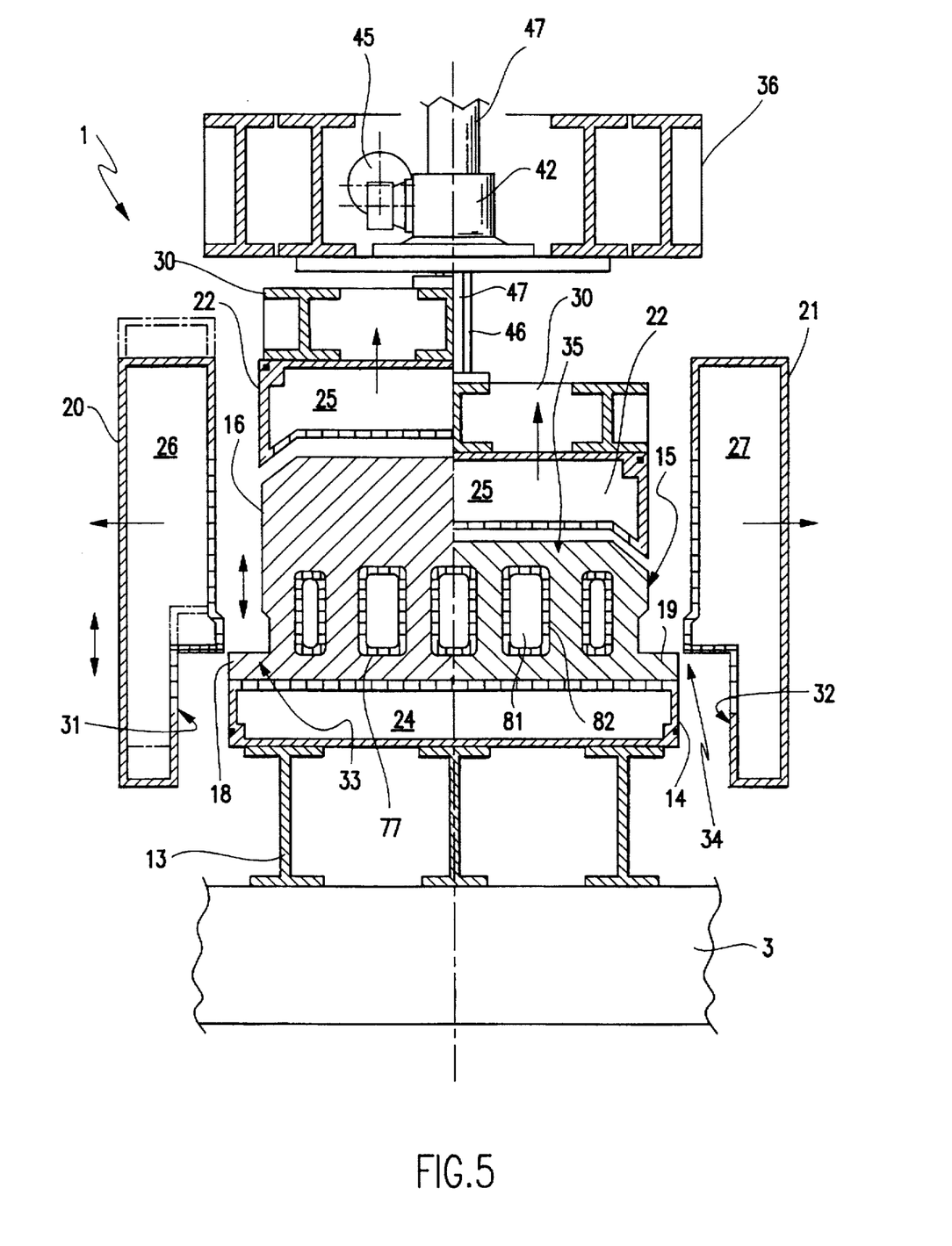
FIG. 5 shows a schematic view, in enlarged scale and partial cross section, of some particulars of the apparatus of FIG. 1 in two different operating conditions thereof.

Advantageously, furthermore, the height of the central body 16 and of the side lugs 18, 19 may be adjusted—as illustrated for example in FIG. 5—in an entirely independent manner, so as to meet in a flexible and rapid way the most varied production requirements.

When the foamed plastic element 15 is, as in the illustrated example, a continuous element designed for building dwelling floors, the apparatus 1 allows to adjust in an extremely flexible manner both the loading characteristics (changed by adjusting the height of the central body 16), and the thermal and acoustic insulation characteristics (changed by adjusting the height of the side lugs 18, 19).

Advantageously, since the bottom walls 14, side walls 20, 21 and cover 22 of the mold 2 are fixed in a removable manner to the supporting frame 13 and to the beams 28–30, the apparatus 1 of the present invention also allows a prompt and easy replacement thereof with walls shaped in a different manner so as to obtain continuous elements having the desired size and shape.

Obviously, those skilled in the art may introduce variants and modifications to the above described invention, in order to satisfy specific and contingent requirements, variants and modifications which fall anyhow within the scope of protection as is defined in the following claims.

I claim:
1. Apparatus for molding a continuous foamed plastic element comprising:
  a) a mold including:
    i) a bottom wall, a pair of opposite side walls and a cover; and
    ii) a molding seat, having a shape mating that of said element, defined in said mold between said side walls, said bottom wall and said cover;
  b) means for displacing said cover and said side walls of the mold towards and away from said bottom wall to longitudinally close and respectively open said mold; and
  c) first means for positioning in an adjustable, manner, said cover away from and towards said bottom wall of the mold to control in an adjustable and substantially continuous manners the height of the molding seat.

2. Apparatus according to claim 1, wherein said first means for adjustably positioning said cover comprises at least one mechanical jack equipped with respective motor means.

3. Apparatus according to claim 2, further comprising a shaft rotated by said motor means, wherein said first means for adjustably positioning said cover comprises a second mechanical jack kinematically connected with said at least one mechanical jack through said shaft rotated by said motor means.

4. Apparatus according to claim 1, wherein said bottom wall, said side walls and said cover of the mold are removable from a respective supporting element.

5. Apparatus according to claim 1, wherein one of said sidewalls is hingedly supported at a free end of said mold, movable between opposite angularly offset positions, wherein said sidewall transversally opens and, respectively, closes said mold.

6. Apparatus according to claim 5, further comprising clasping means for removably retaining said sidewall in a closing position of the mold.

7. Apparatus according to claim 6, wherein said clasping means comprises a groove formed at a free end of the cover of the mold.

8. The apparatus according to claim 1, further comprising means for sealingly closing a shaping portion of said mold, wherein said element is manufactured in a substantially discontinuous manner.

9. Apparatus for molding a continuous foamed plastic element comprising a substantially parallelepipedic central body and at least one lateral lug laterally and longitudinally extending from said central body, said apparatus including:
   a) a mold, wherein a molding seat having a shape mating that of said element is defined, comprising:
      i) a bottom wall, a pair of opposed side walls and a cover;
      ii) a first molding cavity for the central body of said element, defined in said seat between said side walls, said bottom wall and said cover; and
      iii) a second molding cavity for said at least one lug of said element, defined in said seat between a groove formed in at least one of said side walls and said bottom wall;
   b) means for displacing said cover and said side walls of the mold towards and away from said bottom wall to longitudinally close and respectively open said mold; and
   c) means for positioning, in an adjustable manners said at least one side wall away from and towards said bottom wall of the mold to controls in an adjustable and substantially continuous manner, the height of said second molding cavity.

10. Apparatus according to claim 9, wherein said means for adjustably positioning said at least one side wall comprises at least one mechanical jack equipped with respective motor means.

11. Apparatus according to claim 10, further comprising a shaft rotated by said motor means, wherein said means for adjustably positioning said at least one side wall comprises a second mechanical jack, kinematically connected with said at least one mechanical jack through said shaft rotated by said motor means.

12. Apparatus according to claim 9, wherein said means for adjustably positioning said at least one side wall further comprises a plurality of hinges for guided sliding movement of said at least one side wall in a vertical direction.

13. Apparatus according to claim 9, further comprising at least one hollow molding plunger, movable between opposite positions, wherein said plunger is supported in and, respectively, away from said first molding cavity.

14. Apparatus according to claim 9, further comprising means for displacing said continuous foamed plastic element out of said first and second molding cavities.

15. Apparatus according to claim 14, wherein said means for displacing said continuous foamed plastic element comprises at least one molding plunger.

16. The apparatus according to claim 9, further comprising means for sealingly closing a shaping portion of said mold, wherein said element is manufactured in a substantially discontinuous manner.

17. Apparatus for molding a continuous foamed plastic element comprising a substantially parallelepipedic central body and at least one side lug laterally and longitudinally extending from said central body, said apparatus including:
   a) a mold, wherein a molding seat having a shape mating that of said element is defined, comprising:
      i) a bottom wall, a pair of opposed side walls and a cover;
      ii) a first molding cavity for the central body of said element, defined in said seat between said side walls, said bottom wall and said cover;
      iii) a second molding cavity for said at least one lug of said element defined in said seat between a groove formed in at least one of said side walls and said bottom wall;
   b) means for displacing said cover and said side walls of the mold towards and away from said bottom wall to longitudinally close and respectively open said mold;
   c) first and second means for respectively, independently and adjustably positioning said cover and said at least one side wall away from and towards said bottom wall of the mold to control in an adjustable and substantially continuous manner, the height of said first and, respectively, said second molding cavities.

18. Apparatus according to claim 17, wherein said second means for adjustably positioning said at least one side wall comprises at least one mechanical jack equipped with respective motor means.

19. Apparatus according to claim 18, further comprising a shaft rotated by said motor means, wherein said second means for adjustably positioning said at least one side wall comprises a second mechanical jack kinematically connected with said at least one mechanical jack through said shaft rotated by said motor means.

20. Apparatus according to claim 17, wherein said second means for adjustably positioning said at least one side wall further comprises a plurality of hinges for guided sliding movement of said at least one side wall in a vertical direction.

21. Apparatus according to claim 17, wherein said first means for adjustably positioning said cover comprises at least one mechanical jack equipped with respective motor means.

22. Apparatus according to claim 21, further comprising a shaft rotated by said motor means, wherein said second means for adjustably positioning said at least one side wall comprises a second mechanical jack kinematically connected with said at least one mechanical jack through said shaft rotated by said motor means.

23. The apparatus according to claim 6, further comprising means for sealingly closing a shaping portion of said mold,
   wherein said element is manufactured in a substantially discontinuous manner.

* * * * *